US012609224B2

(12) United States Patent
Fu et al.

(10) Patent No.: US 12,609,224 B2
(45) Date of Patent: Apr. 21, 2026

(54) NEODYMIUM-IRON-BORON MAGNET MATERIAL, RAW MATERIAL COMPOSITION, PREPARATION METHOD THEREFOR AND USE THEREOF

(71) Applicant: FUJIAN GOLDEN DRAGON RARE-EARTH Co., Ltd., Fujian (CN)

(72) Inventors: Gang Fu, Fujian (CN); Jiaying Huang, Fujian (CN); Jixiang Huang, Fujian (CN); Qichen Quan, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 929 days.

(21) Appl. No.: 17/639,366

(22) PCT Filed: Jul. 7, 2020

(86) PCT No.: PCT/CN2020/100588

§ 371 (c)(1),
(2) Date: Mar. 1, 2022

(87) PCT Pub. No.: WO2021/098225

PCT Pub. Date: May 27, 2021

(65) Prior Publication Data

US 2022/0336127 A1 Oct. 20, 2022

(30) Foreign Application Priority Data

Nov. 21, 2019 (CN) ........................ 201911150984.0

(51) Int. Cl.
*H01F 1/057* (2006.01)
*C22C 33/00* (2006.01)
(Continued)

(52) U.S. Cl.
CPC ......... *H01F 1/0577* (2013.01); *C22C 33/006* (2013.01); *C22C 33/04* (2013.01);
(Continued)

(58) Field of Classification Search
CPC ........ H01F 1/057; H01F 1/0577; H01F 1/053; H01F 1/047; H01F 41/0293; H01F 41/0266; C22C 33/006; C22C 38/005
See application file for complete search history.

(56) References Cited

U.S. PATENT DOCUMENTS

2019/0185971 A1* 6/2019 Kuniyoshi ................ C22C 1/04

FOREIGN PATENT DOCUMENTS

CN 103077796 A 5/2013
CN 103366918 A 10/2013
(Continued)

OTHER PUBLICATIONS

International Search Report dated Sep. 15, 2020 Issued in PCT application PCT/CN2020/100588.
(Continued)

*Primary Examiner* — Matthew E. Hoban
*Assistant Examiner* — Lynne Edmondson
(74) *Attorney, Agent, or Firm* — Houston Beshining Law Office PLLC; Liangang Ye

(57) ABSTRACT

Disclosed are a neodymium-iron-boron magnet material, a raw material composition, a preparation method therefor and a use thereof. The raw material composition of the neodymium-iron-boron magnet material comprises the following components by mass percentage: 29.5-32.8% of R', wherein R' includes Pr and Nd, and Pr≥17.15%; Al≥0.5%; 0.90-1.2% of B; and 60-68% of Fe. The percentages are the mass percentages relative to the total mass of the raw material composition of the neodymium-iron-boron magnet material. Without adding a heavy rare earth element to the neodymium-iron-boron magnet material, the performance of the neodymium-iron-boron magnet material can still be significantly improved.

17 Claims, 3 Drawing Sheets

(51) Int. Cl.

| | |
|---|---|
| ***C22C 33/04*** | (2006.01) |
| ***C22C 38/00*** | (2006.01) |
| ***C22C 38/06*** | (2006.01) |
| ***C22C 38/10*** | (2006.01) |
| ***C22C 38/16*** | (2006.01) |
| ***H01F 41/02*** | (2006.01) |

(52) U.S. Cl.

CPC .......... *C22C 38/002* (2013.01); *C22C 38/005* (2013.01); *C22C 38/06* (2013.01); *C22C 38/10* (2013.01); *C22C 38/16* (2013.01); *C22C 2202/02* (2013.01)

(56) References Cited

FOREIGN PATENT DOCUMENTS

| | | | | |
|---|---|---|---|---|
| CN | 104064346 A | 9/2014 | | |
| CN | 105513737 A | 4/2016 | | |
| CN | 106128673 A | 11/2016 | | |
| CN | 110797157 A | 2/2020 | | |
| EP | 3196896 A1 * | 7/2017 | .......... | B22D 11/001 |
| JP | 2013225533 A | 10/2013 | | |
| JP | 2018056334 A | 4/2018 | | |
| JP | 2019169542 A | 10/2019 | | |

OTHER PUBLICATIONS

Written Opinion of International Searching Authority dated Sep. 23, 2020 Issued in PCT application PCT/CN2020/100588.

* cited by examiner

NEODYMIUM-IRON-BORON MAGNET MATERIAL, RAW MATERIAL COMPOSITION, PREPARATION METHOD THEREFOR AND USE THEREOF

The present application is a National Stage of International Application No. PCT/CN2020/100588, filed on Jul. 7, 2020, which claims priority of the Chinese Patent Application No. CN 201911150984.0 filed on Nov. 21, 2019, the contents of which are incorporated herein by reference in their entireties.

TECHNICAL FIELD

The present disclosure relates to a neodymium-iron-boron magnet material, a raw material composition and a preparation method therefor and a use thereof.

BACKGROUND

The neodymium-iron-boron (NdFeB) magnet material with $Nd_2Fe_{14}B$ as the main component has high remanence (Br), coercivity and maximum energy product (BHmax) with great comprehensive magnetic properties, and is used in wind power generation, new energy vehicles, inverter household appliances and so on. The rare-earth components of the neodymium-iron-boron magnet materials in the prior art are usually dominated by neodymium with only a small amount of praseodymium. Although there are few reports in the prior art that replacing a portion of neodymium with praseodymium can improve the performance of the magnet material, the improvement is limited and still not significant. On the other hand, the neodymium-iron-boron magnet material with good coercivity and remanence properties in the prior art still need to rely on the addition of large amounts of heavy rare earth elements and the cost is relatively expensive.

Content of the Present Invention

The technical problem to be solved in the present disclosure is for overcoming the defect that the coercivity and remanence of the magnet material cannot be significantly improved after the neodymium is replaced with the praseodymium partially in the neodymium-iron-boron magnet material in the prior art, and it is still necessary to add larger amount of heavy rare earth elements to make the performance of magnet materials more excellent. A neodymium-iron-boron magnet material, a raw material composition and a preparation method therefor and a use thereof are provided. The neodymium-iron-boron magnet material of the present disclosure can still significantly improve the performance of the neodymium-iron-boron magnet material without adding heavy rare earth elements.

The present disclosure solves the above-mentioned technical problems through the following technical solutions.

The present disclosure provides a raw material composition of neodymium-iron-boron magnet material, which comprises the following components by mass percentage: 29.5-32.8% of R', R' comprises Pr and Nd; wherein, Pr≥17.15%;

Al≥0.5%;

0.90-1.2% of B;

60-68% of Fe;

the percentage is the mass percentage relative to the total mass of the raw material composition of neodymium-iron-boron magnet material.

In the present disclosure, the content of Pr is preferably 17.15-30%, for example 17.15%, 18.15%, 19.15%, 20.15%, 21.15%, 22.85%, 23.15%, 24.15%, 25.15%, 26.5%, 27.15% or 30%; more preferably 21-26.5%, the percentage is the mass percentage relative to the total mass of the raw material composition of neodymium-iron-boron magnet material.

In the present disclosure, the ratio of Nd to the total mass of R' is preferably less than 0.5, more preferably 0.04-0.44, for example 0.04, 0.07, 0.12, 0.14, 0.15, 0.18, 0.2, 0.21, 0.22, 0.27, 0.36, 0.37, 0.38, 0.4, 0.41 or 0.44.

In the present disclosure, the content of Nd is preferably 15% or less, more preferably 1.5%-14%, for example 1.5%, 2.45%, 3.85%, 4.05%, 4.55%, 4.85%, 5.85%, 6.65%, 6.85%, 8.35%, 11.65%, 11.85%, 12.85% or 13.85%, the percentage refers to the mass percentage relative to the total mass of the raw material composition of neodymium-iron-boron magnet material.

In the present disclosure, preferably, R' further comprises RH, RH refers to heavy rare earth elements, the kind of RH preferably comprises one or more of Dy, Tb and Ho, more preferably Dy and/or Tb.

Wherein, the mass ratio of RH to R' is preferably less than 0.253, more preferably 0-0.08, for example 1/30.5, 1/32, 1.5/31.85, 2.3/31.9, 1/31, 1.2/30.2, 1.4/30.4, 1.7/30.7, 1.9/31.9, 2.1/31.8, 2.3/31.5, 1/30.5, 1.7/31.7, 1.2/31.2, 1.4/31.4, 1.7/31.7, 0.5/31.5, 0.5/31.3, 1/30.5 or 2.7/32.7.

Wherein, the content of RH is preferably 0.5-2.7%, for example 0.5%, 1%, 1.2%, 1.4%, 1.5%, 1.7%, 1.9%, 2.1%, 2.3% or 2.7%, more preferably 1-2.5%, the percentage is the mass percentage relative to the total mass of the raw material composition of neodymium-iron-boron magnet material.

When RH comprises Tb, the content of Tb is preferably 0.5-2 wt. %, for example 0.5%, 0.7%, 0.8%, 0.9%, 1%, 1.2%, 1.5%, 1.6%, 1.8% or 2%, the percentage is the mass percentage relative to the total mass of the raw material composition of neodymium-iron-boron magnet material.

When RH comprises Dy, the content of Dy is preferably 0.5 wt. % or less, for example 0.1%, 0.2%, 0.3% or 0.5%, the percentage is the mass percentage relative to the total mass of the raw material composition of neodymium-iron-boron magnet material.

When RH comprises Ho, the content of Ho can be the conventional addition amount in the field, usually 0.8-2.0%, for example 1%.

In the present disclosure, the content of Al is preferably 0.5-3 wt. %, for example 0.5%, 0.6%, 0.8%, 0.9%, 1%, 1.1%, 1.2%, 1.3%, 1.4%, 1.5%, 1.6%, 1.7%, 1.8%, 1.9%, 2.0%, 2.1%, 2.2%, 2.3%, 2.5%, 2.7%, 2.8%, 2.9% or 3%, the percentage refers to the mass percentage relative to the total mass of the raw material composition of neodymium-iron-boron magnet material.

In the present disclosure, the content of B is preferably 0.95-1.2%, for example 0.95%, 0.96%, 0.98%, 0.985%, 0.99%, 1%, 1.1% or 1.2%, the percentage refers to the mass percentage relative to the total mass of the raw material composition of neodymium-iron-boron magnet material.

In the present disclosure, the content of Fe is preferably 60-67.515%, for example 60.03%, 62.76%, 62.96%, 63.145%, 63.735%, 63.885%, 63.935%, 64.04%, 64.265%, 64.315%, 64.57%, 64.735%, 64.815%, 64.865%, 64.97%, 64.985%, 65.015%, 65.065%, 65.115%, 65.135%, 65.265%, 65.315%, 65.385%, 65.515%, 65.56%, 65.665%, 65.715%, 65.765%, 65.815%, 65.85%, 65.985%, 65.915%, 65.9655%, 65.995%, 66.065%, 66.115%, 66.165%, 66.215%, 66.315%, 66.465%, 66.515%, 66.665%, 66.715%, 66.75%, 66.815%, 66.915%, 67.115%, 67.215%, 67.315%, 67.4%, 67.415%, 67.515% or 67.615%, the percentage refers to the mass percentage relative to the total mass of the raw material composition of neodymium-iron-boron magnet material.

In the present disclosure, preferably, the raw material composition of neodymium-iron-boron magnet material further comprises Cu.

In the present disclosure, the content of Cu is preferably 0.1-1.2%, for example 0.1%, 0.35%, 0.4%, 0.45%, 0.48%, 0.5%, 0.55%, 0.6%, 0.65%, 0.7%, 0.75%, 0.8%, 0.85%, 0.9%, 1% or 1.1%, the percentage refers to the mass percentage relative to the total mass of the raw material composition of neodymium-iron-boron magnet material.

In the present disclosure, preferably, the raw material composition of neodymium-iron-boron magnet material further comprises Ga.

In the present disclosure, the content of Ga is preferably 0.45 wt. % or less, for example 0.05%, 0.1%, 0.2%, 0.25%, 0.3%, 0.35% or 0.42%, the percentage refers to the mass percentage relative to the total mass of the raw material composition of neodymium-iron-boron magnet material.

In the present disclosure, preferably, the raw material composition of neodymium-iron-boron magnet material further comprises X, preferably, X comprises Zr, Nb, Hf or Ti.

Wherein, the content of Zr is preferably 0.05-0.5%, for example 0.1%, 0.2%, 0.25%, 0.28%, 0.3% or 0.35%, the percentage refers to the mass percentage relative to the total mass of the raw material composition of neodymium-iron-boron magnet material.

In the present disclosure, preferably, the raw material composition of neodymium-iron-boron magnet material further comprises Co.

Wherein, the content of Co is preferably 0.5-3%, for example 1% or 3%, the percentage refers to the mass percentage relative to the total mass of the raw material composition of neodymium-iron-boron magnet material.

In the present disclosure, the raw material composition of neodymium-iron-boron magnet material usually further comprises 0.

Wherein, the content of 0 is preferably 0.13% or less, the percentage refers to the mass percentage relative to the total mass of the raw material composition of neodymium-iron-boron magnet material.

In the present disclosure, preferably, the raw material composition of neodymium-iron-boron magnet material may further comprise other elements common in the art, for example one or more of Zn, Ag, In, Sn, V, Cr, Mo, Ta and W.

Wherein, the content of Zn can be the conventional content in the field, preferably 0.01-0.1%, for example 0.02% or 0.05%, the percentage refers to the mass percentage relative to the total mass of the raw material composition of neodymium-iron-boron magnet material.

Wherein, the content of Mo can be the conventional content in the field, preferably 0.01-0.1%, for example 0.02% or 0.05%, the percentage refers to the mass percentage relative to the total mass of the raw material composition of neodymium-iron-boron magnet material.

In the present disclosure, the raw material composition of neodymium-iron-boron magnet material preferably comprises the following components by mass percentage: 29.5-32.8% of R', wherein, R' refers to rare earth elements, R' comprises Pr and Nd; wherein, Pr≥17.15%; Al≥0.5%; Cu≤1.2%; 0.90-1.2% of B; 60-68% of Fe; more preferably, the content of Pr is 17.15-30%; more preferably, the content of Al is 0.5-3%; more preferably, the content of Cu is 0.35-1.3%; more preferably, R' further comprises RH, RH refers to heavy rare earth elements, and the content of RH is preferably 1-2.5%; the percentage is the mass percentage relative to the total mass of the raw material composition of neodymium-iron-boron magnet material.

In the present disclosure, the raw material composition of neodymium-iron-boron magnet material preferably comprises the following components by mass percentage: 29.5-32.8% of R', wherein, R' refers to rare earth elements, R' comprises Pr and Nd; wherein, Pr≥17.15%; Al≥0.5%; 0.25-0.3% of Zr; 0.90-1.2% of B; 60-68% of Fe; more preferably, the content of Pr is 17.15-30%; more preferably, the content of Al is 0.5-3%; more preferably, R' further comprises RH, RH refers to heavy rare earth elements, and the content of RH is preferably 1-2.5%, the percentage is the mass percentage relative to the total mass of the raw material composition of neodymium-iron-boron magnet material.

In the present disclosure, the raw material composition of neodymium-iron-boron magnet material preferably comprises the following components by mass percentage: 29.5-32.8% of R', wherein, R' refers to rare earth elements, R' comprises Pr and Nd; wherein, Pr≥17.15%; Al≥0.5%; Cu≤1.2%; 0.25-0.3% of Zr; 0.90-1.2% of B; 60-68% of Fe; more preferably, the content of Pr is 17.15-30%; more preferably, the content of Al is 0.5-3%; more preferably, the content of Cu is 0.35-1.3%; more preferably, R' further comprises RH, RH refers to heavy rare earth elements, and the content of RH is preferably 1-2.5%, the percentage is the mass percentage relative to the total mass of the raw material composition of neodymium-iron-boron magnet material.

In the present disclosure, the raw material composition of neodymium-iron-boron magnet material preferably comprises the following components by mass percentage: 29.5-32.8% of R', wherein, R' refers to rare earth elements, R' comprises Pr and Nd; wherein, Pr≥17.15%; Al≥0.5%; Ga≤0.42%; 0.90-1.2% of B; 60-68% of Fe; more preferably, the content of Pr is 17.15-30%; more preferably, the content of Al is 0.5-3%; more preferably, R' further comprises RH, RH refers to heavy rare earth elements, and the content of RH is preferably 1-2.5%, the percentage is the mass percentage relative to the total mass of the raw material composition of neodymium-iron-boron magnet material.

In the present disclosure, the raw material composition of neodymium-iron-boron magnet material preferably comprises the following components by mass percentage: 29.5-32.8% of R', wherein, R' refers to rare earth elements, R' comprises Pr and Nd; wherein, Pr≥17.15%; Al≥0.5%; Ga≤0.42%; Cu≤1.2%; 0.90-1.2% of B; 60-68% of Fe; more preferably, the content of Pr is 17.15-30%; more preferably, the content of Al is 0.5-3%; more preferably, the content of Cu is 0.35-1.3%; more preferably, R' further comprises RH, RH refers to heavy rare earth elements, and the content of RH is preferably 1-2.5%, the percentage is the mass percentage relative to the total mass of the raw material composition of neodymium-iron-boron magnet material.

In the present disclosure, the raw material composition of neodymium-iron-boron magnet material preferably comprises the following components by mass percentage: 29.5-32.8% of R', wherein, R' refers to rare earth elements, R' comprises Pr and Nd; wherein, Pr≥17.15%; Al≥0.5%; Ga≤0.42%; 0.25-0.3% of Zr; 0.90-1.2% of B; 60-68% of Fe; more preferably, the content of Pr is 17.15-30%; more preferably, the content of Al is 0.5-3%; more preferably, R' further comprises RH, RH refers to heavy rare earth elements, and the content of RH is preferably 1-2.5%, the percentage is the mass percentage relative to the total mass of the raw material composition of neodymium-iron-boron magnet material.

In the present disclosure, the raw material composition of neodymium-iron-boron magnet material preferably comprises the following components by mass percentage: 29.5-32.8% of R', wherein, R' refers to rare earth elements, R' comprises Pr and Nd; wherein, Pr≥17.15%; Al≥0.5%; Ga≤0.42%; Cu≤1.2%; 0.25-0.3% of Zr; 0.90-1.2% of B; 60-68% of Fe; more preferably, the content of Pr is 17.15-30%; more preferably, the content of Al is 0.5-3%; more preferably, the content of Cu is 0.35-1.3%; more preferably, R' further comprises RH, RH refers to heavy rare earth elements, and the content of RH is preferably 1-2.5%, the kind of RH is preferably Dy and/or Tb, wherein the content of Tb is preferably 0.5-2%; the percentage is the mass percentage relative to the total mass of the raw material composition of neodymium-iron-boron magnet material.

The present disclosure further provides a preparation method for neodymium-iron-boron magnet material, which employs the raw material composition of neodymium-iron-boron magnet material comprising Pr and Al mentioned above to prepare.

In the present disclosure, preferably, the preparation method comprises the following steps: subjecting the molten liquid of the raw material composition of neodymium-iron-boron magnet material mentioned above to melting and casting, hydrogen decrepitation, forming, sintering and aging treatment.

In the present disclosure, the molten liquid of the raw material composition of neodymium-iron-boron magnet material can be prepared by the conventional method in the field, for example: melting in a high frequency vacuum induction melting furnace. The vacuum degree of the melting furnace can be $5\times10^{-2}$ Pa. The temperature of the melting can be 1500° C. or less.

In the present disclosure, the operations and conditions of casting can be conventional in the field, for example, in Ar atmosphere (for example in Ar atmosphere of $5.5\times10^{4}$ Pa), cooling at $10^{2}$° C./sec-$10^{4}$° C./sec.

In the present disclosure, the operations and conditions of hydrogen decrepitation can be conventional in the field. For example, being subject to hydrogen absorption, dehydrogenation and cooling treatment.

Wherein, the hydrogen absorption can be carried out at the hydrogen pressure of 0.15 MPa.

Wherein, the dehydrogenation can be carried out under the condition of heating while evacuating.

In the present disclosure, the conventional pulverization in the field can be carried out after hydrogen decrepitation. The pulverization process can be conventional in the field, for example jet mill pulverization. The jet mill pulverization is preferably carried out in nitrogen atmosphere with an oxidizing gas content of 150 ppm or less. The oxidizing gas refers to the content of oxygen or moisture. The pressure in the pulverization chamber of jet mill pulverization is preferably 0.38 MPa; the time of the jet mill pulverization is preferably 3 h.

Wherein, after the pulverization, lubricants can be added to the powder by the conventional method in the field, for example zinc stearate. The amount of lubricant added can be 0.10-0.15%, for example 0.12%, by weight of the mixed powder.

In the present disclosure, the operations and conditions of the forming can be conventional in the field, for example magnetic field forming method or hot press and hot deformation method.

In the present disclosure, the operations and conditions of the sintering can be conventional in the field. For example, preheating, sintering and cooling in vacuum (for example in vacuum of $5\times10^{-3}$ Pa).

Wherein, the temperature of the preheating is usually 300-600° C. The time of the preheating is usually 1-2 h. The preheating is preferably carried out at 300° C. and 600° C. for 1 h respectively.

Wherein, the temperature of the sintering is preferably 1030-1080° C., for example 1040° C.

Wherein, the time of the sintering is conventional in the field, for example 2h.

Wherein, before the cooling, Ar gas can be introduced to make the pressure reach 0.1 MPa.

In the present disclosure, after the sintering and before the aging treatment, a grain boundary diffusion treatment is further carried out preferably.

Wherein, the operations and conditions of the grain boundary diffusion can be conventional in the field. For example, the surface of the neodymium-iron-boron magnet material is attached with Tb-containing substance and/or Dy-containing substance by evaporating, coating or sputtering, and subjected to diffusion heat treatment.

The Tb-containing substance can be a Tb metal, a Tb-containing compound, for example a Tb-containing fluoride or alloy.

The Dy-containing substance can be a Dy metal, a Dy-containing compound, for example a Dy-containing fluoride or alloy.

The temperature of the diffusion heat treatment may be 800-900° C., for example 850° C.

The time of the diffusion heat treatment can be 12-48 h, for example 24h.

In the present disclosure, in the aging treatment, the temperature of secondary aging treatment is preferably 550-650° C., for example 550° C.

In the present disclosure, in the secondary aging treatment, the temperature is heated to 550-650° C. preferably at a heating rate of 3-5° C./min. The starting point of heating can be room temperature.

In the present disclosure, the room temperature is 25° C.±5° C.

The present disclosure further provides a neodymium-iron-boron magnet material, which is prepared by the preparation method mentioned above.

The present disclosure further provides a neodymium-iron-boron magnet material, which comprises the following components by mass percentage: 29.4-32.8% of R', R' comprises Pr and Nd; wherein, Pr≥17.12%;

Al≥0.48%;

0.90-1.2% of B;

60-68% of Fe; the percentage is the mass percentage relative to the total mass of the neodymium-iron-boron magnet material.

In the present disclosure, the content of Pr is preferably 17.12-30%, for example 17.12%, 17.13%, 17.14%, 17.15%, 18.13%, 18.14%, 18.15%, 18.16%, 19.12%, 19.14%, 20.05%, 20.13%, 20.14%, 21.12%, 21.13%, 21.14%, 21.15%, 21.16%, 23.11%, 23.12%, 23.13%, 13.15%, 24.16%, 25.12%, 25.13%, 25.14%, 25.16%, 25.17%, 26.52%, 27.15% or 30%, the percentage is the mass percentage relative to the total mass of the neodymium-iron-boron magnet material.

In the present disclosure, the content of Nd is preferably 15% or less, more preferably 1.5-14%, for example 1.5%, 2.45%, 3.83%, 3.84%, 3.86%, 3.89%, 4.03%, 4.52%, 4.82%, 4.83%, 4.84%, 4.86%, 4.87%, 5.84%, 6.82%, 6.83%, 6.84%, 6.86%, 8.33%, 8.34%, 8.35%, 8.36%, 11.55%, 11.63%, 11.64%, 11.66%, 11.85%, 12.82%, 12.83%, 12.84%, 12.85%, 12.89%, 13.81%, 13.82%, 13.84% or 13.85%, the percentage is the mass percentage relative to the total mass of the neodymium-iron-boron magnet material.

In the present disclosure, preferably, the R' further comprises RH, RH refers to heavy rare earth elements; the kind of RH preferably comprises one or more of Dy, Tb and Ho, more preferably Dy and/or Tb.

Wherein, the mass ratio of RH to R' is preferably less than 0.253, more preferably 0-0.08.

Wherein, the content of RH is preferably 3% or less, more preferably 0.4-3%, for example 0.48%, 0.51%, 0.56%, 1%, 1.02%, 1.03%, 1.04%, 1.19%, 1.21%, 1.25%, 1.42%, 1.43%, 1.52%, 1.7%, 1.71%, 1.72%, 1.91%, 2.13%, 2.33%, 2.69% or 2.71%, the percentage is the mass percentage relative to the total mass of the neodymium-iron-boron magnet material.

When RH comprises Tb, the content of Tb is preferably 0.5-2.1%, for example 0.51%, 0.56%, 0.69%, 0.71%, 0.81%, 0.83%, 0.88%, 0.9%, 1%, 1.01%, 1.02%, 1.03%, 1.04%, 1.2%, 1.21%, 1.5%, 1.58%, 1.59%, 1.6%, 1.8%, 2.01% or 1.02%, the percentage is the mass percentage relative to the total mass of the neodymium-iron-boron magnet material.

When RH comprises Dy, the content of Dy is preferably 0.51% or less, preferably 0.1-0.51%, for example 0.11%, 0.12%, 0.13%, 0.19%, 0.21%, 0.22%, 0.23%, 0.29%, 0.31%, 0.32%, 0.48%, 0.49% or 0.51%, the percentage is the mass percentage relative to the total mass of the neodymium-iron-boron magnet material.

When RH comprises Ho, the content of Ho can be the conventional addition amount in the field, usually 0.8-2%, for example 1%, the percentage is the mass percentage relative to the total mass of the neodymium-iron-boron magnet material.

In the present disclosure, the content of Al is preferably 0.48-3%, for example 0.48%, 0.49%, 0.58%, 0.6%, 0.61%, 0.8%, 0.82%, 0.83%, 0.89%, 0.9%, 0.91%, 0.92%, 1.01%, 1.02%, 1.03%, 1.04%, 1.09%, 1.21%, 1.22%, 1.23%, 1.31%, 1.42%, 1.49%, 1.51%, 1.52%, 1.53%, 1.62%, 1.63%, 1.7%, 1.79%, 1.81%, 1.82%, 1.9%, 1.91%, 1.92%, 2.01%, 2.02%, 2.03%, 1.12%, 2.21%, 2.3%, 2.31%, 2.52%, 2.71%, 2.91% or 2.98%, the percentage is the mass percentage relative to the total mass of the neodymium-iron-boron magnet material.

In the present disclosure, the content of B is preferably 0.95-1.2%, for example 0.951%, 0.962%, 0.981%, 0.982%, 0.983%, 0.984%, 0.985%, 0.986%, 0.99%, 0.998%, 1.03% or 1.11%, the percentage is the mass percentage relative to the total mass of the neodymium-iron-boron magnet material.

In the present disclosure, the content of Fe is preferably 59.9-67.7%, for example 59.932%, 62.8%, 62.88%, 63.136%, 63.896%, 64.029%, 64.234%, 64.266%, 64.566%, 64.799%, 64.897%, 64.915%, 64.985%, 64.987%, 65.084%, 65.096%, 65.146%, 65.264%, 65.299%, 65.309%, 65.327%, 65.347%, 65.385%, 65.514%, 65.524%, 65.548%, 65.664% 65.665%, 65.689%, 65.779%, 65.829%, 65.867%, 65.877%, 65.896%, 65.944%, 66.019%, 66.047%, 66.174%, 66.236%, 66.249%, 66.327%, 66.386%, 66.496%, 66.534%, 66.964%, 66.699%, 66.73%, 66.847%, 66.917%, 67.029%, 67.088%, 67.115%, 67.216%, 67.224%, 67.315%, 67.426%, 67.45%, 67.526%, 67.587% or 67.607%, the percentage is the mass percentage relative to the total mass of the neodymium-iron-boron magnet material.

In the present disclosure, the neodymium-iron-boron magnet material preferably further comprises Cu.

In the present disclosure, the content of Cu is preferably 1.2% or less, for example 0.11%, 0.34%, 0.35%, 0.4%, 0.41%, 0.45%, 0.5%, 0.51%, 0.55%, 0.6%, 0.63%, 0.65%, 0.72%, 0.75%, 0.81%, 0.85%, 0.91%, 1.02%, 1.03%, 1.04% or 1.11%, more preferably 0.34-1.3%, the percentage is the mass percentage relative to the total mass of the neodymium-iron-boron magnet material.

In the present disclosure, the neodymium-iron-boron magnet material preferably further comprises Ga.

In the present disclosure, the content of Ga is preferably 0.42% or less, for example 0.05%, 0.1%, 0.2%, 0.23%, 0.25%, 0.251%, 0.31%, 0.34%, 0.36%, 0.41%, 0.42%, 0.43% or 0.44%, more preferably 0.25-0.42%, the percentage is the mass percentage relative to the total mass of the neodymium-iron-boron magnet material.

In the present disclosure, the neodymium-iron-boron magnet material preferably further comprises X, and X preferably comprises Zr, Nb, Hf or Ti.

Wherein, the content of the Zr is preferably 0.05-0.5%, for example 0.1%, 0.11%, 0.2%, 0.22%, 0.24%, 0.25%, 0.27%, 0.28%, 0.3%, 0.31%, 0.32%, 0.34%, 0.35%, 0.36%, 0.37% or 0.38%, the percentage is the mass percentage relative to the total mass of the neodymium-iron-boron magnet material.

In the present disclosure, the neodymium-iron-boron magnet material preferably further comprises Co.

In the present disclosure, the content of Co is preferably 0.5-3.5%, for example 1% or 3.03%, the percentage refers to the mass percentage relative to the total mass of the raw material composition of neodymium-iron-boron magnet material.

In the present disclosure, the neodymium-iron-boron magnet material usually further comprises O.

Wherein, the content of O is preferably 0.13% or less, the percentage refers to the mass percentage relative to the total mass of the raw material composition of neodymium-iron-boron magnet material.

In the present disclosure, the neodymium-iron-boron magnet material can further comprise other conventional elements in the field, for example one or more of Zn, Ag, In, Sn, V, Cr, Nb, Mo, Ta and W.

Wherein, the content of Zn can be the conventional content in the field, preferably 0.01-0.1%, for example 0.03% or 0.04%, the percentage refers to the mass percentage of each component relative to the total mass of the neodymium-iron-boron magnet material.

Wherein, the content of Mo can be the conventional content in the field, preferably 0.01-0.1%, for example 0.02% or 0.06%, the percentage refers to the mass percentage of each component relative to the total mass of the neodymium-iron-boron magnet material.

In the present disclosure, the neodymium-iron-boron magnet material preferably comprises the following components by mass percentage: 29.4-32.8% of R', wherein, R' refers to rare earth elements, R' comprises Pr and Nd; wherein, Pr≥17.12%; Al≥0.48%; Cu≤1.2%; 0.90-1.2% of B; 60-68% of Fe; more preferably, the content of Pr is 17.12-30%; more preferably, the content of Al is 0.48-3%; more preferably, the content of Cu is 0.34-1.3%; more preferably, R' further comprises RH, RH refers to heavy rare earth elements, and the content of RH is preferably 1-2.5%; the percentage is the mass percentage of each component relative to the total mass of the neodymium-iron-boron magnet material.

In the present disclosure, the neodymium-iron-boron magnet material preferably comprises the following components by mass percentage: 29.4-32.8% of R', wherein, R' refers to rare earth elements, R' comprises Pr and Nd; wherein, Pr≥17.12%; Al≥0.48%; 0.25-0.3% of Zr; 0.90-1.2% of B; 60-68% of Fe; more preferably, the content of Pr is 17.12-30%; more preferably, the content of Al is 0.48-3%; more preferably, R' further comprises RH, RH refers to heavy rare earth elements, and the content of RH is preferably 1-2.5%; the percentage is the mass percentage of each component relative to the total mass of the neodymium-iron-boron magnet material.

In the present disclosure, the neodymium-iron-boron magnet material preferably comprises the following components by mass percentage: 29.4-32.8% of R', wherein, R' refers to rare earth elements, R' comprises Pr and Nd; wherein, Pr≥17.12%; Al≥0.48%; Cu≤1.2%; 0.25-0.3% of Zr; 0.90-1.2% of B; 60-68% of Fe; more preferably, the content of Pr is 17.12-30%; more preferably, the content of Al is 0.48-3%; more preferably, the content of Cu is 0.34-1.3%; more preferably, R' further comprises RH, RH refers to heavy rare earth elements, and the content of RH is preferably 1-2.5%; the percentage is the mass percentage of each component relative to the total mass of the neodymium-iron-boron magnet material.

In the present disclosure, the neodymium-iron-boron magnet material preferably comprises the following components by mass percentage: 29.4-32.8% of R', wherein, R' refers to rare earth elements, R' comprises Pr and Nd; wherein, Pr≥17.12%; Al≥0.48%; Ga≤0.44%; 0.90-1.2% of B; 60-68% of Fe; more preferably, the content of Pr is 17.12-30%; more preferably, the content of Al is 0.48-3%; more preferably, R' further comprises RH, RH refers to heavy rare earth elements, and the content of RH is preferably 1-2.5%; the percentage is the mass percentage of each component relative to the total mass of the neodymium-iron-boron magnet material.

In the present disclosure, the neodymium-iron-boron magnet material preferably comprises the following components by mass percentage: 29.4-32.8% of R', wherein, R' refers to rare earth elements, R' comprises Pr and Nd; wherein, Pr≥17.12%; Al≥0.48%; Ga≤0.44%; Cu≤1.2%; 0.90-1.2% of B; 60-68% of Fe; more preferably, the content of Pr is 17.15-30%; more preferably, the content of Al is 0.48-3%; more preferably, the content of Cu is 0.34-1.3%; more preferably, R' further comprises RH, RH refers to heavy rare earth elements, and the content of RH is preferably 1-2.5%; the percentage is the mass percentage of each component relative to the total mass of the neodymium-iron-boron magnet material.

In the present disclosure, the neodymium-iron-boron magnet material preferably comprises the following components by mass percentage: 29.4-32.8% of R', wherein, R' refers to rare earth elements, R' comprises Pr and Nd; wherein, Pr≥17.12%; Al≥0.48%; Ga≤0.44%; 0.25-0.3% of Zr; 0.90-1.2% of B; 60-68% of Fe; more preferably, the content of Pr is 17.12-30%; more preferably, the content of Al is 0.48-3%; more preferably, R' further comprises RH, RH refers to heavy rare earth elements, and the content of RH is preferably 1-2.5%; the percentage is the mass percentage of each component relative to the total mass of the neodymium-iron-boron magnet material.

In the present disclosure, the neodymium-iron-boron magnet material preferably comprises the following components by mass percentage: 29.4-32.8% of R', wherein, R' refers to rare earth elements, R' comprises Pr and Nd; wherein, Pr≥17.12%; Al≥0.48%; Ga≤0.44%; Cu≤1.2%; 0.25-0.3% of Zr; 0.90-1.2% of B; 60-68% of Fe; more preferably, the content of Pr is 17.12-30%; more preferably, the content of Al is 0.5-3%; more preferably, the content of Cu is 0.34-1.3% more preferably, R' further comprises RH, RH refers to heavy rare earth elements, and the content of RH is preferably 1-2.5%; the percentage is the mass percentage of each component relative to the total mass of the neodymium-iron-boron magnet material.

The present disclosure further provides a neodymium-iron-boron magnet material, in the intergranular triangle region of the neodymium-iron-boron magnet material, the ratio of the total mass of Pr and Al to the total mass of Nd and Al is ≤1.0;

at the grain boundary of the neodymium-iron-boron magnet material, the ratio of the total mass of Pr and Al to the total mass of Nd and Al is ≥0.1;

Preferably, the components of the neodymium-iron-boron magnet material refer to those of the neodymium-iron-boron magnet material mentioned above.

In the present disclosure, the grain boundary refers to the boundary between two grains, and the intergranular triangle region is the gap formed by three and more grains.

The present disclosure further provides a use of the neodymium-iron-boron magnet material as an electronic component in a motor.

Based on the common sense in the field, the preferred conditions of the preparation methods can be combined arbitrarily to obtain preferred examples of the present disclosure.

The reagents and raw materials used in the invention are commercially available.

The positive progress of the present invention is that: in the prior art, adding Pr and Al to the neodymium-iron-boron magnet material can increase the coercive force, but reduce the remanence at the same time. Through a large number of experiments, the inventor found that the compatibility of a specific content of Pr and Al can produce a synergistic effect, that is, adding a specific content of Pr and Al at the same time can make the coercivity of the neodymium-iron-boron magnet more significantly improved, while the remanence is only slightly reduced. And the magnet material in the present disclosure still has high coercivity and remanence without adding heavy rare earth elements.

DETAILED DESCRIPTION OF THE PREFERRED EMBODIMENT

Figure 1:
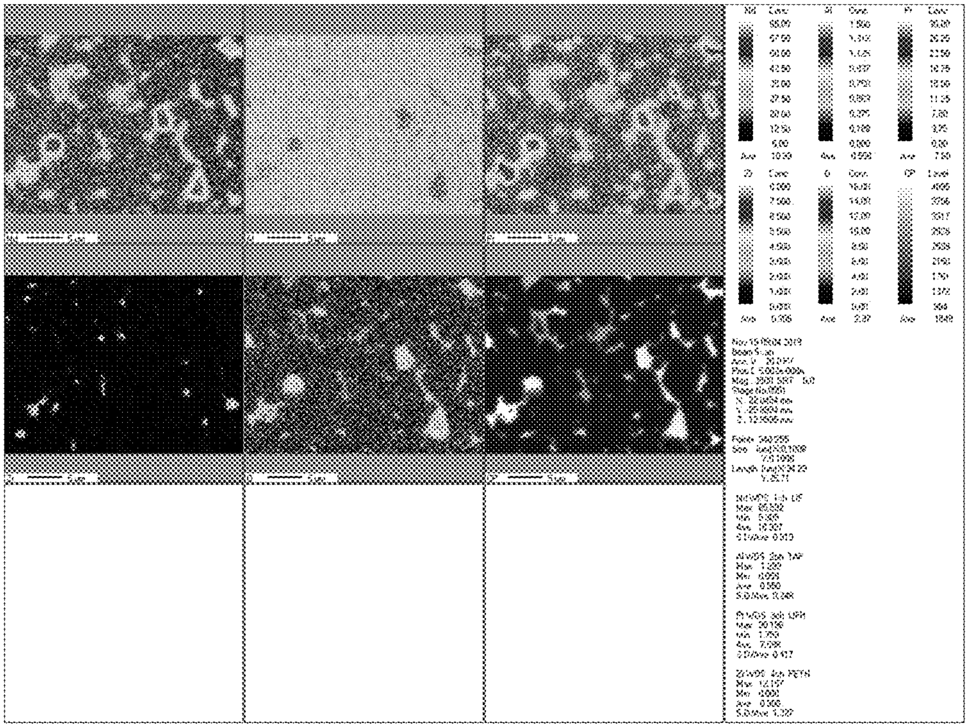
FIG. 1 is the element distribution diagram of the neodymium-iron-boron magnet material of Example 11.

The following examples further illustrate the present disclosure, but the present disclosure is not limited thereto. Experiment methods in which specific conditions are not indicated in the following embodiments are selected according to conventional methods and conditions, or according to the product specification. In the table below, wt. % refers to the mass percentage of the component in the raw material composition of the R-T-B permanent magnet material, and "/" indicates that the element has not been added. "Br" is the residual magnetic flux density and "Hcj" is the intrinsic coercivity.

The formulations for the raw material compositions of the neodymium-iron-boron magnet materials in each Examples 1-45 and Comparative Examples 46-49 are shown in Table 1 below.

TABLE 1

| Formulations for the raw material compositions of the neodymium-iron-boron magnet materials (wt. %) | | | | | | | | | | | | | | |
|---|---|---|---|---|---|---|---|---|---|---|---|---|---|---|
| No. | Nd | Pr | Dy | Tb | Ho | Al | Cu | Ga | Zr | Co | Zn | Mo | B | Fe |
| 1 | 13.85 | 17.15 | / | / | / | 0.5 | / | / | / | / | / | / | 0.985 | 67.515 |
| 2 | 12.85 | 18.15 | / | / | / | 0.6 | / | / | / | / | / | / | 1 | 67.4 |
| 3 | 11.85 | 19.15 | / | / | / | 0.8 | / | / | / | / | / | / | 0.985 | 67.215 |
| 4 | 11.65 | 20.15 | / | / | / | 0.9 | / | / | / | / | / | / | 0.985 | 66.315 |
| 5 | 8.35 | 21.15 | 0.3 | 0.7 | / | 1 | / | / | / | / | / | / | 0.985 | 67.515 |
| 6 | 6.85 | 24.15 | 0.5 | 0.5 | / | 1.2 | / | / | / | / | / | / | 0.985 | 65.815 |
| 7 | 5.85 | 25.15 | / | 1 | / | 1.5 | / | / | / | / | / | / | 0.985 | 65.515 |
| 8 | 3.85 | 26.5 | / | 1.5 | / | 1.8 | / | / | / | / | / | / | 0.985 | 65.365 |
| 9 | 2.45 | 27.15 | 0.3 | 0 | / | 2 | / | / | / | / | / | / | 0.985 | 65.115 |
| 10 | 1.5 | 30 | / | / | / | 2.2 | / | / | / | / | / | / | 0.985 | 65.315 |
| 11 | 13.85 | 17.15 | / | / | / | 2.5 | / | / | 0.25 | / | / | / | 0.985 | 65.265 |
| 12 | 12.85 | 18.15 | / | / | / | 3.0 | / | / | / | / | / | / | 0.985 | 65.015 |
| 13 | 11.65 | 20.15 | / | / | / | 0.9 | 0.1 | / | / | / | / | / | 0.985 | 66.215 |
| 14 | 12.85 | 18.15 | / | / | / | 1 | 0.35 | / | / | / | / | / | 0.985 | 66.665 |
| 15 | 12.85 | 18.15 | / | / | / | 1.1 | 0.4 | / | / | / | / | / | 0.985 | 66.515 |
| 16 | 11.65 | 20.15 | / | / | / | 1.2 | 0.5 | / | / | / | / | / | 0.985 | 65.515 |
| 17 | 8.35 | 21.15 | / | / | / | 1.3 | 0.6 | / | / | / | / | / | 0.985 | 67.615 |
| 18 | 8.35 | 21.15 | / | / | / | 1.4 | 0.7 | / | / | / | / | / | 0.985 | 67.415 |
| 19 | 6.85 | 24.15 | / | / | / | 1.5 | 0.8 | / | / | / | / | / | 0.985 | 65.715 |
| 20 | 4.85 | 25.15 | 0.3 | 0.7 | / | 1.6 | / | 0.25 | / | / | / | / | 0.985 | 66.165 |
| 21 | 4.85 | 25.15 | 0.3 | 0.7 | / | 1.6 | / | 0.35 | / | / | / | / | 0.985 | 66.065 |
| 22 | 4.85 | 25.15 | 0.2 | 0.8 | / | 1.7 | / | 0.42 | / | / | / | / | 0.985 | 65.895 |
| 23 | 4.85 | 25.15 | 0.2 | 0.8 | / | 1.7 | / | 0 | 0 | 1 | / | / | 0.985 | 65.315 |
| 24 | 4.85 | 25.15 | 0.1 | 0.9 | / | 1.8 | / | 0 | 0.25 | / | / | / | 0.985 | 65.965 |
| 25 | 4.85 | 25.15 | 0.1 | 0.9 | / | 1.8 | / | 0 | 0.3 | / | / | / | 0.985 | 65.915 |
| 26 | 3.85 | 25.15 | 0.2 | 1 | / | 1.9 | 0.35 | 0.25 | 0 | / | / | / | 0.985 | 66.315 |
| 27 | 3.85 | 25.15 | 0.2 | 1 | / | 1.9 | 0.5 | 0.42 | 0 | / | / | / | 0.985 | 65.995 |
| 28 | 3.85 | 25.15 | 0.2 | 1.2 | / | 2 | / | 0.25 | 0.25 | / | / | / | 0.985 | 66.115 |
| 29 | 3.85 | 25.15 | 0.2 | 1.2 | / | 2 | / | 0.42 | 0.3 | / | / | / | 0.985 | 65.895 |
| 30 | 3.85 | 25.15 | 0.2 | 1.5 | / | 1 | 0.35 | / | 0.1 | / | / | / | 1.1 | 66.75 |
| 31 | 4.85 | 25.15 | 0.2 | 1.5 | / | 1 | 0.35 | / | 0.2 | / | / | / | 0.985 | 65.765 |
| 32 | 4.85 | 25.15 | 0.1 | 1.6 | / | 1.2 | 0.5 | / | 0.25 | / | / | / | 0.985 | 65.365 |
| 33 | 4.85 | 25.15 | 0.1 | 1.8 | / | 1.2 | 0.5 | / | 0.28 | / | / | / | 0.985 | 65.135 |
| 34 | 4.55 | 25.15 | 0.1 | 2 | / | 1.5 | 0.6 | / | 0.3 | / | / | / | 0.985 | 64.815 |
| 35 | 4.05 | 25.15 | 0.3 | 2 | / | 1.5 | 0.6 | / | 0.35 | / | / | / | 0.985 | 65.065 |
| 35.1 | 8.35 | 21.15 | / | 1 | / | 0.6 | 0.35 | / | 0.25 | / | / | / | 0.985 | 67.315 |
| 35.2 | 8.35 | 21.15 | / | 1 | / | 0.8 | 0.35 | / | 0.25 | / | / | / | 0.985 | 67.115 |
| 35.3 | 12.85 | 18.15 | / | / | / | 1.7 | 0.4 | / | 0.25 | / | / | / | 0.985 | 65.665 |
| 35.4 | 12.85 | 18.15 | / | / | / | 1.9 | 0.45 | / | 0.28 | / | / | / | 0.985 | 65.385 |
| 35.5 | 13.85 | 17.15 | / | / | / | 2.3 | 0.45 | / | 0.28 | / | / | / | 0.985 | 64.985 |
| 35.6 | 13.85 | 17.15 | 0 | 0 | / | 2.5 | 0.48 | / | 0.3 | / | / | / | 0.985 | 64.735 |
| 35.7 | 4.85 | 25.15 | 0.2 | 1.5 | / | 2.8 | 0.48 | / | 0.3 | / | / | / | 0.985 | 63.735 |
| 36 | 6.85 | 23.15 | 0.2 | 1 | / | 0.5 | 0.35 | 0.05 | 0.1 | / | / | / | 0.985 | 66.815 |
| 37 | 6.85 | 23.15 | 0.2 | 1 | / | 0.6 | 0.45 | 0.1 | 0.2 | / | / | / | 0.985 | 66.465 |
| 38 | 6.85 | 23.15 | 0.2 | 1.2 | / | 0.8 | 0.55 | 0.2 | 0.25 | / | / | / | 0.95 | 65.85 |
| 39 | 6.85 | 23.15 | 0.2 | 1.2 | / | 0.9 | 0.65 | 0.25 | 0.28 | / | / | / | 0.96 | 65.56 |
| 40 | 6.85 | 23.15 | 0.2 | 1.5 | / | 1 | 0.75 | 0.3 | 0.3 | / | / | / | 0.98 | 64.97 |
| 41 | 6.85 | 23.15 | 0.2 | 1.5 | / | 1.2 | 0.85 | 0.35 | 0.35 | / | / | / | 0.98 | 64.57 |
| 42 | 6.85 | 23.15 | 0.1 | 1.6 | / | 1.5 | 1 | 0.42 | 0.35 | / | / | / | 0.99 | 64.04 |
| 42.1 | 12.85 | 18.15 | 0.5 | | / | 1.8 | 0.35 | 0.25 | 0.25 | / | / | / | 0.985 | 64.865 |
| 42.2 | 12.85 | 18.15 | 0.3 | 0.7 | / | 2.1 | 0.4 | 0.3 | 0.28 | / | / | / | 0.985 | 63.935 |
| 42.3 | 11.65 | 19.15 | / | 0.5 | / | 2.3 | 0.5 | 0.35 | 0.3 | / | / | / | 0.985 | 64.265 |
| 42.4 | 11.65 | 19.15 | / | 1 | / | 2.5 | 0.8 | 0.42 | 0.35 | / | | / | 0.985 | 63.145 |
| 42.5 | 8.35 | 21.15 | / | 1 | / | 2.7 | 0.9 | 0.35 | 0.25 | / | / | / | 0.985 | 64.315 |
| 42.6 | 8.35 | 21.15 | / | 1 | / | 2.9 | 1.1 | 0.35 | 0.28 | / | / | / | 0.985 | 63.885 |
| 43 | 6.85 | 23.15 | 0.1 | 1.6 | 1.0 | 1.5 | 1 | 0.42 | 0.35 | 3 | / | / | 1 | 60.03 |
| 44 | 6.85 | 23.15 | 0.1 | 1.6 | 1.0 | 1.5 | 1 | 0.42 | 0.35 | / | 0.05 | 0.02 | 1.2 | 62.76 |
| 45 | 6.85 | 23.15 | 0.1 | 1.6 | 1.0 | 1.5 | 1 | 0.42 | 0.35 | / | 0.02 | 0.05 | 1 | 62.96 |
| 46 | 11.65 | 20.15 | / | / | / | 0.4 | 0.1 | / | / | / | / | / | 0.985 | 66.715 |
| 47 | 11.65 | 20.15 | / | / | / | 0.2 | 0.1 | / | / | / | / | / | 0.985 | 66.915 |
| 48 | 15.65 | 15.15 | / | / | / | 0.9 | 0.1 | / | / | / | / | / | 0.985 | 67.215 |
| 49 | 21.65 | 10.15 | / | / | / | 0.9 | 0.1 | / | / | / | / | / | 0.985 | 66.215 |

Example 1

The neodymium-iron-boron magnet material comprising Pr and Al was prepared as follows:

(1) Melting and casting: according to the formulation for the raw material compositions in each Example and Comparative Example shown in Table 1, the prepared raw material was put into a crucible made of alumina and vacuum melted in a high frequency vacuum induction melting furnace and in a vacuum of $5\times10^{-2}$ Pa at a temperature of 1500° C. or less. After the vacuum melting, Ar gas was introduced into the melting furnace to make the pressure reach 55,000 Pa, then casting was carried out, and the quenched alloy was obtained at a cooling rate of $10^{2}$° C./sec to $10^{4}$° C./sec.

(2) Hydrogen decrepitation: the melting furnace in which the quench alloy was placed was evacuated at room temperature, and then hydrogen of 99.9% purity was introduced into the furnace for hydrogen decrepitation to maintain the hydrogen pressure at 0.15 MPa; after full hydrogen absorption, vacuuming was conducted while heating up to fully dehydrogenate; then cooling was carried out and the powder after hydrogen decrepitation was taken out.

(3) Micro pulverization process: the powder after hydrogen decrepitation was pulverized by jet mill for 3 hours under a nitrogen atmosphere with an oxidizing gas content of 150 ppm or less and under a pressure of 0.38 MPa in the pulverization chamber to obtain a fine powder. The oxidizing gas referred to oxygen or moisture.

(4) Zinc stearate was added to the powder from jet mill pulverization, and the addition amount of zinc stearate was 0.12% by weight of the mixed powder, and then mixed thoroughly with a V-mixer.

(5) Magnetic field forming process: the above-mentioned zinc stearate added powder was formed into a cube with a side length of 25 mm through primary forming by using a rectangular oriented magnetic field forming machine at an oriented magnetic field of 1.6 T and a forming pressure of 0.35 ton/cm$^2$; and it was demagnetized in a magnetic field of 0.2 T after the primary forming. In order to prevent the formed body obtained after the primary forming from being exposed to air, it was sealed, and then a secondary forming machine (isostatic forming machine) was used to perform secondary forming at a pressure of 1.3 ton/cm$^2$.

(6) Sintering process: each formed body was moved to the sintering furnace for sintering, which was held in vacuum of $5\times10^{-3}$ Pa at 300° C. and 600° C. for 1 hour respectively; then, sintered at 1040° C. for 2 hours; then cooled to room temperature after the pressure reached 0.1 MPa by introducing Ar gas, to obtain sintered body.

(7) Aging treatment process: the sintered body was heat treated in high purity Ar gas at 600° C. for 3 hours and then heated to 550° C. at a heating rate of 3° C./min, it was cooled to room temperature before being taken out.

The parameters in the preparation processes of Examples 1-45 and Comparative Examples 46-49 were the same as Example 1 except that the formulations of the raw material compositions are different selected in the preparation processes.

Example 50

The neodymium-iron-boron magnet material of Example 50 was obtained by employing the Dy grain boundary diffusion method based on the raw material composition of Example 1, and the preparation process was as follows:

The No. 1 in Table 1 was first prepared according to the preparation of the sintered body of Example 1 to obtain a sintered body, followed by grain boundary diffusion, and then the aging treatment was carried out. Wherein, the process of aging treatment was the same as in Example 1, and the process of grain boundary diffusion was as follows:

The sintered body was processed into a magnet with a diameter of 20 mm and a sheet thickness of less than 3 mm in the direction of the magnetic field orientation, and after surface cleaning, the magnet was coated with a full spray using a raw material prepared with Dy fluoride, and the coated magnet was dried and the metal attached with Tb element was sputtered on the magnet surface in a high purity Ar atmosphere, diffusion heat treatment was carried out at the temperature of 850° C. for 24 hours. Cooled to room temperature.

Example 51

The neodymium-iron-boron magnet material of Example 51 was obtained by employing the Dy grain boundary diffusion method based on the raw material composition of Example 1, and the preparation process was as follows:

The No. 1 in Table 1 was first prepared according to the preparation of the sintered body of Example 1 to obtain a sintered body, followed by grain boundary diffusion, and then the aging treatment was carried out. Wherein, the process of aging treatment was the same as in Example 1, and the process of grain boundary diffusion was as follows:

The sintered body was processed into a magnet with a diameter of 20 mm and a sheet thickness of less than 7 mm in the direction of the magnetic field orientation, and after surface cleaning, the magnet was coated with a full spray using a raw material prepared with Tb fluoride, respectively, and the coated magnet was dried and the metal with attached Tb element was sputtered on the magnet surface in a high purity Ar atmosphere, diffusion heat treatment was carried out at the temperature of 850° C. for 24 hours. Cooled to room temperature.

Effect Examples

The magnetic properties and compositions of the neodymium-iron-boron magnet materials produced in each Example and Comparative Example were measured and the crystalline phase structure of the magnets was observed by FE-EPMA.

(1) Magnetic properties evaluation: The magnet materials were tested for magnetic properties by using the NIM-10000H BH bulk rare earth permanent magnet non-destructive measurement system from the National Institute of Metrology, China. The results of the magnetic properties testing were shown in Table 2 below.

TABLE 2

Testing results of the magnetic properties

| No. | Br (kGs) | Hcj (kOe) | Absolute value of Hcj temperature coefficient at 80° C. | Absolute value of Hcj temperature coefficient at 150° C. | Absolute value of Hcj temperature coefficient at 180° C. |
|---|---|---|---|---|---|
| 1 | 13.74 | 19.2 | 0.668 | / | / |
| 2 | 13.61 | 19.95 | 0.647 | / | / |
| 3 | 13.44 | 21.19 | 0.609 | / | / |
| 4 | 13.10 | 22.32 | 0.596 | / | / |
| 5 | 13.04 | 25.57 | / | 0.519 | / |

TABLE 2-continued

| Testing results of the magnetic properties | | | | | |
|---|---|---|---|---|---|
| No. | Br (kGs) | Hcj (kOe) | Absolute value of Hcj temperature coefficient at 80° C. | Absolute value of Hcj temperature coefficient at 150° C. | Absolute value of Hcj temperature coefficient at 180° C. |
| 6 | 12.38 | 27.73 | / | 0.498 | / |
| 7 | 11.87 | 30.06 | / | / | 0.439 |
| 8 | 11.61 | 32.02 | / | / | 0.429 |
| 9 | 11.17 | 35.5 | / | / | 0.385 |
| 10 | 11.46 | 29.95 | / | 0.488 | / |
| 11 | 11.76 | 27.55 | / | 0.492 | / |
| 12 | 11.05 | 28.5 | / | 0.499 | / |
| 13 | 13.11 | 22.53 | 0.591 | / | / |
| 14 | 13.26 | 22.76 | 0.589 | / | / |
| 15 | 13.16 | 23.37 | 0.576 | / | / |
| 16 | 12.81 | 24.97 | / | 0.523 | / |
| 17 | 13.24 | 24.96 | / | 0.526 | / |
| 18 | 13.13 | 25.03 | / | 0.519 | / |
| 19 | 12.6 | 26.5 | / | 0.511 | / |
| 20 | 12.1 | 29.9 | / | / | 0.446 |
| 21 | 12.05 | 30.61 | / | / | 0.444 |
| 22 | 11.71 | 30.1 | / | / | 0.443 |
| 23 | 11.91 | 28.87 | / | 0.495 | / |
| 24 | 11.7 | 28.64 | / | 0.498 | / |
| 25 | 11.5 | 29.02 | / | 0.493 | / |
| 26 | 11.58 | 32.7 | / | / | 0.439 |
| 27 | 11.38 | 33.5 | / | / | 0.435 |
| 28 | 11.3 | 32.5 | / | / | 0.431 |
| 29 | 11.28 | 33.75 | / | / | 0.426 |
| 30 | 12.36 | 31.29 | / | / | 0.448 |
| 31 | 12.19 | 31.79 | / | / | 0.449 |
| 32 | 12.19 | 30.72 | / | / | 0.438 |
| 33 | 11.76 | 32.88 | / | / | 0.431 |
| 34 | 11.33 | 34.75 | / | / | 0.421 |
| 35 | 11.23 | 34.1 | / | / | 0.425 |
| 35.1 | 13.15 | 24.96 | / | 0.526 | / |
| 35.2 | 12.97 | 25.95 | / | 0.513 | / |
| 35.3 | 12.29 | 25.14 | / | 0.519 | / |
| 35.4 | 12.08 | 26.14 | / | 0.508 | / |
| 35.5 | 11.7 | 27.85 | / | 0.492 | / |
| 35.6 | 11.57 | 28.42 | / | 0.481 | / |
| 35.7 | 10.85 | 35.1 | / | / | 0.388 |
| 36 | 13.22 | 25.97 | / | / | / |
| 37 | 13.09 | 27.11 | / | 0.517 | / |
| 38 | 12.58 | 29.81 | / | 0.488 | / |
| 39 | 12.10 | 33.14 | / | / | 0.429 |
| 40 | 12.0 | 33.35 | / | / | 0.424 |
| 41 | 11.8 | 33.28 | / | / | 0.427 |
| 42 | 11.6 | 33.6 | / | / | 0.420 |
| 42.1 | 12 | 28..24 | / | 0.512 | / |
| 42.2 | 11.38 | 31.2 | / | / | 0.441 |
| 42.3 | 11.44 | 32.45 | / | / | 0.438 |
| 42.4 | 10.5 | 34.5 | / | / | 0.424 |
| 42.5 | 10.42 | 36.2 | / | / | 0.375 |
| 42.6 | 10.22 | 37.2 | / | / | 0.364 |
| 43 | 10.6 | 36 | / | / | 0.380 |
| 44 | 10.52 | 36.5 | / | / | 0.372 |
| 45 | 10.48 | 36.3 | / | / | 0.376 |
| 46 | 12.48 | 25 | / | 0.517 | / |
| 47 | 12.60 | 23 | 0.601 | / | / |
| 48 | 12.37 | 21.01 | 0.623 | / | / |
| 49 | 12.24 | 20.2 | 0.642 | / | / |
| 50 | 13.56 | 25.5 | / | 0.514 | / |
| 51 | 13.53 | 30.1 | / | / | 0.449 |

(2) Component determination: each component was determined by using a high frequency inductively coupled plasma emission spectrometer (ICP-OES). The component determination results of the neodymium-iron-boron magnet materials in each Example and Comparative Example were shown in Table 3 below.

TABLE 3

| Testing results of compositions of the neodymium-iron-boron magnet materials (wt. %) | | | | | | | | | | | | | | |
|---|---|---|---|---|---|---|---|---|---|---|---|---|---|---|
| No. | Nd | Pr | Dy | Tb | Ho | Al | Cu | Ga | Zr | Co | Zn | Mo | B | Fe |
| 1 | 13.82 | 17.13 | 0 | 0 | / | 0.48 | 0 | 0 | 0 | / | / | / | 0.983 | 67.587 |
| 2 | 12.82 | 18.13 | 0 | 0 | / | 0.61 | 0 | 0 | 0 | / | / | / | 0.99 | 67.45 |
| 3 | 11.85 | 19.12 | 0 | 0 | / | 0.82 | 0 | 0 | 0 | / | / | / | 0.986 | 67.224 |
| 4 | 11.64 | 20.14 | 0 | 0 | / | 0.91 | 0 | 0 | 0 | / | / | / | 0.983 | 66.327 |
| 5 | 8.34 | 21.14 | 0.29 | 0.71 | / | 1.01 | 0 | 0 | 0 | / | / | / | 0.984 | 67.526 |
| 6 | 6.86 | 24.16 | 0.49 | 0.51 | / | 1.22 | 0 | 0 | 0 | / | / | / | 0.981 | 65.779 |
| 7 | 5.84 | 25.12 | / | 1.02 | / | 1.51 | 0 | 0 | 0 | / | / | / | 0.986 | 65.524 |
| 8 | 3.86 | 26.52 | / | 1.52 | / | 1.79 | 0 | 0 | 0 | / | / | / | 0.983 | 65.327 |
| 9 | 2.45 | 27.15 | 0.29 | 2.02 | / | 2.01 | 0 | 0 | 0 | / | / | / | 0.984 | 65.096 |
| 10 | 1.5 | 30 | / | / | / | 2.21 | 0 | 0 | 0 | / | / | / | 0.981 | 65.309 |
| 11 | 13.84 | 17.14 | / | / | / | 2.52 | 0 | 0 | 0.25 | / | / | / | 0.986 | 65.264 |
| 12 | 12.89 | 18.16 | / | / | / | 2.98 | 0 | 0 | 0 | / | / | / | 0.983 | 64.987 |
| 13 | 11.55 | 20.05 | / | / | / | 0.92 | 0.11 | 0 | 0 | / | / | / | 0.984 | 66.386 |
| 14 | 12.83 | 18.13 | / | / | / | 1.02 | 0.34 | 0 | 0 | / | / | / | 0.981 | 66.699 |
| 15 | 12.82 | 18.16 | / | / | / | 1.09 | 0.41 | 0 | 0 | / | / | / | 0.986 | 66.534 |
| 16 | 11.63 | 20.13 | / | / | / | 1.23 | 0.51 | 0 | 0 | / | / | / | 0.986 | 65.514 |
| 17 | 8.34 | 21.13 | / | / | / | 1.31 | 0.63 | 0 | 0 | / | / | / | 0.983 | 67.607 |
| 18 | 8.33 | 21.12 | / | / | / | 1.42 | 0.72 | 0 | 0 | / | / | / | 0.984 | 67.426 |
| 19 | 6.83 | 24.16 | / | / | / | 1.53 | 0.81 | 0 | 0 | / | / | / | 0.981 | 65.689 |
| 20 | 4.82 | 25.17 | 0.31 | 0.69 | / | 1.62 | 0 | 0.23 | 0 | / | / | / | 0.986 | 66.174 |
| 21 | 4.83 | 25.14 | 0.32 | 0.71 | / | 1.63 | 0 | 0.34 | 0 | / | / | / | 0.983 | 66.047 |
| 22 | 4.84 | 25.12 | 0.19 | 0.83 | / | 1.73 | 0 | 0.41 | 0 | / | / | / | 0.984 | 65.896 |
| 23 | 4.83 | 25.13 | 0.23 | 0.81 | / | 1.72 | 0 | 0 | 0 | 1 | / | | 0.981 | 65.299 |
| 24 | 4.86 | 25.14 | 0.12 | 0.88 | / | 1.82 | 0 | 0 | 0.25 | / | / | / | 0.986 | 65.944 |
| 25 | 4.87 | 25.13 | 0.13 | 0.9 | / | 1.81 | 0 | 0 | 0.3 | / | / | / | 0.983 | 65.877 |
| 26 | 3.89 | 25.16 | 0.21 | 1 | / | 1.92 | 0.35 | 0.25 | 0 | / | / | / | 0.984 | 66.236 |
| 27 | 3.86 | 25.12 | 0.19 | 1 | / | 1.91 | 0.5 | 0.42 | 0 | / | / | / | 0.981 | 66.019 |
| 28 | 3.84 | 25.13 | 0.23 | 1.2 | / | 2.02 | 0 | 0.25 | 0.25 | / | / | / | 0.986 | 66.094 |
| 29 | 3.84 | 25.14 | 0.22 | 1.2 | / | 2.03 | 0 | 0.42 | 0.3 | / | / | / | 0.983 | 65.867 |

TABLE 3-continued

Testing results of compositions of the neodymium-iron-boron magnet materials (wt. %)

| No. | Nd | Pr | Dy | Tb | Ho | Al | Cu | Ga | Zr | Co | Zn | Mo | B | Fe |
|---|---|---|---|---|---|---|---|---|---|---|---|---|---|---|
| 30 | 3.83 | 25.13 | 0.21 | 1.5 | / | 1.03 | 0.35 | 0 | 0.11 | / | / | / | 1.11 | 66.73 |
| 31 | 4.86 | 25.16 | 0.22 | 1.5 | / | 1.04 | 0.35 | 0 | 0.22 | / | / | / | 0.986 | 65.664 |
| 32 | 4.87 | 25.12 | 0.11 | 1.6 | / | 1.23 | 0.5 | 0 | 0.24 | / | / | / | 0.983 | 65.347 |
| 33 | 4.84 | 25.13 | 0.11 | 1.8 | / | 1.21 | 0.5 | 0 | 0.28 | / | / | / | 0.984 | 65.146 |
| 34 | 4.52 | 25.14 | 0.12 | 2.01 | / | 1.53 | 0.6 | 0 | 0.3 | / | / | / | 0.981 | 64.799 |
| 35 | 4.03 | 25.13 | 0.31 | 2.02 | / | 1.49 | 0.6 | 0 | 0.35 | / | / | / | 0.986 | 65.084 |
| 35.1 | 8.35 | 21.15 | / | 1 | / | 0.6 | 0.35 | / | 0.25 | / | / | / | 0.985 | 67.315 |
| 35.2 | 8.35 | 21.15 | / | 1 | / | 0.8 | 0.35 | / | 0.25 | / | / | / | 0.985 | 67.115 |
| 35.3 | 12.85 | 18.15 | / | / | / | 1.7 | 0.4 | / | 0.25 | / | / | / | 0.985 | 65.665 |
| 35.4 | 12.85 | 18.15 | / | / | / | 1.9 | 0.45 | / | 0.28 | / | / | / | 0.985 | 65.385 |
| 35.5 | 13.85 | 17.15 | / | / | / | 2.3 | 0.45 | / | 0.28 | / | / | / | 0.985 | 64.985 |
| 36 | 6.83 | 23.11 | 0.22 | 1.03 | / | 0.48 | 0.35 | 0.05 | 0.1 | / | / | / | 0.983 | 66.847 |
| 37 | 6.82 | 23.12 | 0.21 | 1.04 | / | 0.58 | 0.45 | 0.1 | 0.2 | / | / | / | 0.984 | 66.496 |
| 38 | 6.83 | 23.13 | 0.22 | 1.21 | / | 0.83 | 0.55 | 0.2 | 0.25 | / | / | / | 0.951 | 65.829 |
| 39 | 6.84 | 23.13 | 0.21 | 1.21 | / | 0.92 | 0.65 | 0.25 | 0.28 | / | / | / | 0.962 | 65.548 |
| 40 | 6.84 | 23.15 | 0.22 | 1.51 | / | 1.02 | 0.75 | 0.31 | 0.32 | / | / | / | 0.983 | 64.897 |
| 41 | 6.83 | 23.11 | 0.21 | 1.51 | / | 1.21 | 0.85 | 0.36 | 0.37 | / | / | / | 0.984 | 64.566 |
| 42 | 6.84 | 23.12 | 0.11 | 1.59 | / | 1.51 | 1.02 | 0.44 | 0.36 | / | / | / | 0.981 | 64.029 |
| 42.1 | 12.84 | 18.14 | 0.48 | / | / | 1.81 | 0.34 | 0.251 | 0.24 | / | / | / | 0.984 | 64.915 |
| 42.2 | 12.83 | 18.16 | 0.31 | 0.71 | / | 2.12 | 0.41 | 0.31 | 0.27 | / | / | / | 0.984 | 63.896 |
| 42.3 | 11.66 | 19.14 | / | 0.51 | / | 2.31 | 0.51 | 0.34 | 0.31 | / | / | / | 0.986 | 64.234 |
| 42.4 | 11.64 | 19.14 | / | 1.02 | / | 2.52 | 0.81 | 0.41 | 0.34 | / | | / | 0.984 | 63.136 |
| 42.5 | 8.36 | 21.16 | / | 1.03 | / | 2.71 | 0.91 | 0.34 | 0.24 | / | / | / | 0.984 | 64.266 |
| 42.6 | 8.34 | 21.14 | / | 1.01 | / | 2.91 | 1.11 | 0.34 | 0.27 | / | / | / | 0.984 | 63.896 |
| 43 | 6.86 | 23.13 | 0.12 | 1.58 | 0.99 | 1.52 | 1.03 | 0.43 | 0.38 | 3.03 | / | / | 0.998 | 59.932 |
| 44 | 6.86 | 23.13 | 0.13 | 1.58 | 1.0 | 1.51 | 1.04 | 0.41 | 0.37 | / | 0.04 | 0.02 | 1.11 | 62.8 |
| 45 | 6.86 | 23.11 | 0.12 | 1.59 | 1.0 | 1.52 | 1.03 | 0.41 | 0.36 | / | 0.03 | 0.06 | 1.03 | 62.88 |
| 46 | 11.64 | 20.14 | / | / | / | 0.41 | 0.13 | / | / | / | / | / | 0.986 | 66.694 |
| 47 | 11.63 | 20.13 | / | / | / | 0.22 | 0.12 | / | / | / | / | / | 0.983 | 66.917 |
| 48 | 15.63 | 15.14 | / | / | / | 0.90 | 0.13 | / | / | / | / | / | 0.984 | 67.216 |
| 49 | 21.62 | 10.14 | / | / | / | 0.89 | 0.12 | / | / | / | / | / | 0.981 | 66.249 |
| 50 | 13.81 | 17.12 | 0.51 | 0 | / | 0.49 | 0 | 0 | 0 | / | / | / | 0.982 | 67.088 |
| 51 | 13.82 | 17.13 | 0 | 0.56 | / | 0.48 | 0 | 0 | 0 | / | / | / | 0.981 | 67.029 |

(3) FE-EPMA inspection: The neodymium-iron-boron magnet material of Example 11 was tested by the Field Emission Electron Probe Micro-Analyzer (FE-EPMA) (Japan Electronics Company (JEOL), 8530F). The elements of Pr, Nd, Al, Zr and O in the magnet material were determined, and the elements at the grain boundary and the intergranular triangular region were quantitatively analyzed. Wherein: the grain boundary refer to the boundary between two grains, and the intergranular triangle region refer to the gap formed by three and more grains.

Figure 2:
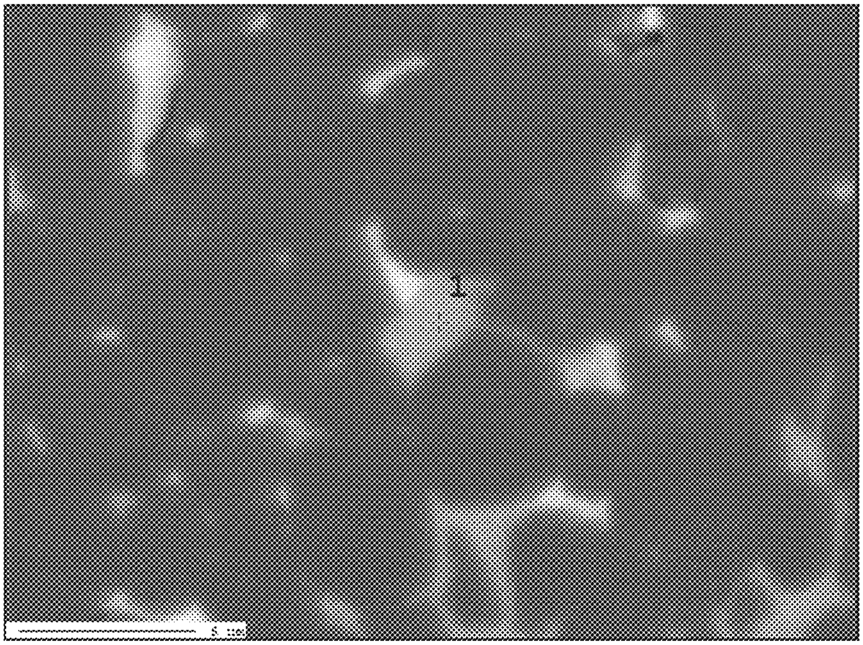
FIG. 2 is the element distribution diagram at the grain boundary of the neodymium-iron-boron magnet material of Example 11, and symbol 1 in the figure shows the point taken at the grain boundary in quantitative analysis.

It can be seen from FIG. 1 that Pr and Nd elements were mainly distributed in the main phase, part of the rare earth was also present at the grain boundary, element Al was distributed in the main phase, and element Zr was distributed at the grain boundaries. As shown in FIG. 2, which is the element distribution diagram at the grain boundary of the neodymium-iron-boron magnet material of Example 11, the point marked with 1 in FIG. 2 was taken for quantitative analysis of the elements at the grain boundaries, the results were shown in Table 4 below:

TABLE 4

| Pr (wt. %) | Nd (wt. %) | Al (wt. %) | Zr (wt. %) | O (wt. %) | Fe (wt. %) |
|---|---|---|---|---|---|
| 45.5 | 10.5 | 0.19 | 0.059 | 0.80 | Balance |

From the above data, it can be seen that Pr and Nd were present at the grain boundary in the form of rare earth rich phases and oxides, which were respectively a-Pr and a-Nd, $Pr_2O_3$, $Nd_2O_3$ and NdO, and Al occupied a certain content of about 0.2 wt. % at the grain boundary in addition to the main phase, for example 0.19 wt. % in this example. Zr as a high melting point element was diffusely distributed throughout the region.

Figure 3:
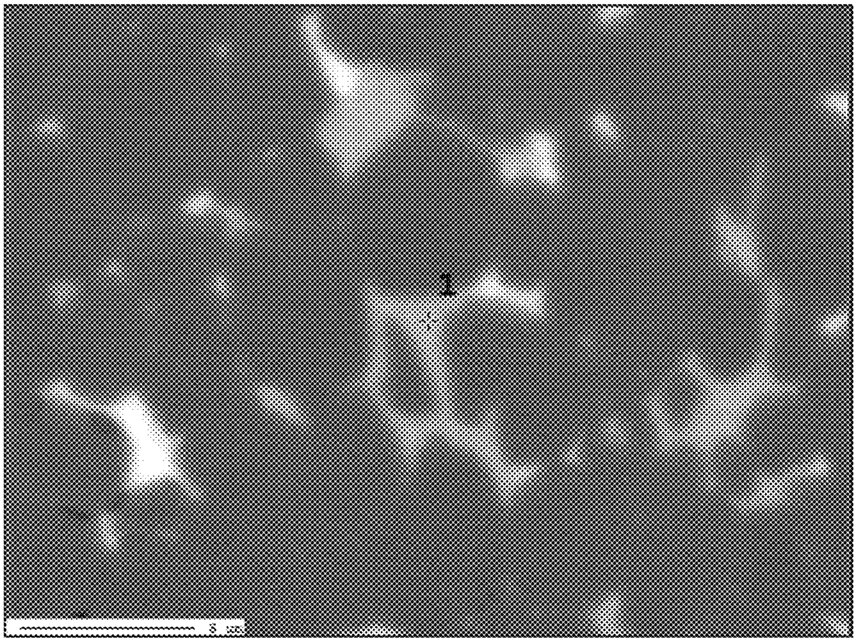
FIG. 3 is the element distribution diagram of the intergranular triangular region of the neodymium-iron-boron magnet material of Example 11, and symbol 1 in the figure is the point taken at the intergranular triangular region in quantitative analysis.

As shown in FIG. 3, which is the element distribution diagram of the intergranular triangular region, the point marked with 1 in FIG. 3 was taken for quantitative analysis of the elements at the intergranular triangular region, the results were shown in Table 5 below:

TABLE 5

| Pr (wt. %) | Nd (wt. %) | Al (wt. %) | Zr (wt. %) | O (wt. %) | Fe (wt. %) |
|---|---|---|---|---|---|
| 32.8 | 42.3 | 1.38 | 0.079 | 1.2 | Balance |

It can be seen from Table 5 that Pr and Nd elements were distributed in the intergranular triangular region. In the formulation of this example, it is clearly found that the content of Pr is obviously lower than that of Nd in the intergranular triangular region, although rare earths are partially enriched here, the enrichment degree of Pr is less than that of Nd, which is one of the reasons why high Pr and Al work together to improve the coercivity. At the same time, there is a partial distribution of O and Zr therein.

What is claimed is:

1. A neodymium-iron-boron magnet material, which comprises the following components by mass percentage: 29.4-32.8% of R', R' comprises Pr and Nd; wherein, the content of Pr is 17.12-30%;

Al≥0.48%;

0.90-1.2% of B;

60-68% of Fe;

the percentage is the mass percentage relative to the total mass of the neodymium-iron-boron magnet material;

wherein, in the intergranular triangular region of the neodymium-iron-boron magnet material, the ratio of the total mass of Pr and Al to the total mass of Nd and Al is ≤1.0;

at the grain boundary of the neodymium-iron-boron magnet material, the ratio of the total mass of Pr and Al to the total mass of Nd and Al is ≥0.1.

2. The neodymium-iron-boron magnet material according to claim 1, wherein, the content of Nd is 15% or less;

or, the content of Al is 0.48-3%;

or, the content of B is 0.95-1.2%;

or, the content of Fe is 59.9-67.7%.

3. A neodymium-iron-boron magnet material, wherein, in the intergranular triangular region of the neodymium-iron-boron magnet material, the ratio of the total mass of Pr and Al to the total mass of Nd and Al is ≤1.0;

at the grain boundary of the neodymium-iron-boron magnet material, the ratio of the total mass of Pr and Al to the total mass of Nd and Al is ≥0.1.

4. An electronic component in a motor comprising the neodymium-iron-boron magnet material according to claim 1.

5. The neodymium-iron-boron magnet material according to claim 1, wherein, R' further comprises RH, RH refers to heavy rare earth elements; RH comprises at least one selected from the group consisting of Dy, Tb and Ho; the mass ratio of RH to R' is less than 0.253; the content of RH is 3% or less.

6. The neodymium-iron-boron magnet material according to claim 5, wherein, when RH comprises Tb, the content of Tb is 0.5-2.1 wt. %;

or, when RH comprises Dy, the content of Dy is 0.51 wt. % or less;

or, when RH comprises Ho, the content of Ho is 0.8-2%.

7. The neodymium-iron-boron magnet material according to claim 1, wherein, the neodymium-iron-boron magnet material further comprises Cu; the content of Cu is 1.2% or less;

or, the neodymium-iron-boron magnet material further comprises Ga; the content of Ga is 0.42% or less;

or, the neodymium-iron-boron magnet material further comprises X, and X comprises Zr, Nb, Hf or Ti;

or, the neodymium-iron-boron magnet material further comprises Co; the content of Co is 0.5-3.5%;

or, the neodymium-iron-boron magnet material further comprises O, the content of O is 0.13% or less;

or, the neodymium-iron-boron magnet material further comprises at least one selected from the group consisting of Zn, Ag, In, Sn, V, Cr, Mo, Ta and W.

8. A preparation method for the neodymium-iron-boron magnet material according to claim 1, which employs a raw material composition;

the preparation method comprises the following steps: subjecting the molten liquid of the raw material composition to melting and casting, hydrogen decrepitation, forming, sintering, and aging treatment;

the raw material composition comprises the following components by mass percentage:

29.5-32.8% of R', R' comprises Pr and Nd; wherein, the content of Pr is 17.15-30%;

Al≥0.5%;

0.90-1.2% of B;

60-68% of Fe;

the percentage is the mass percentage relative to the total mass of the raw material composition of neodymium-iron-boron magnet material.

9. The preparation method for the neodymium-iron-boron magnet material according to claim 8, wherein, the ratio of Nd to the total mass of R' is less than 0.5;

or, the content of Nd is 15% or less;

or, the content of Al is 0.5-3 wt. %;

or, the content of B is 0.95-1.2%;

or, the content of Fe is 60-67.515%.

10. The preparation method for the neodymium-iron-boron magnet material according to claim 8, wherein, the raw material composition further comprises the following components by mass percentage: Cu≤1.2%; 0.25-0.3% of Zr.

11. The preparation method for the neodymium-iron-boron magnet material according to claim 8, wherein, the raw material composition further comprises the following components by mass percentage: Ga≤0.42%; Cu≤1.2%; 0.25-0.3% of Zr.

12. The preparation method for the neodymium-iron-boron magnet material according to claim 8, wherein, R' further comprises RH, RH refers to heavy rare earth elements, RH comprises at least one selected from the group consisting of Dy, Tb and Ho; the mass ratio of RH to R' is less than 0.253; the content of RH is 0.5-2.7%.

13. The preparation method for the neodymium-iron-boron magnet material according to claim 12, wherein, when RH comprises Tb, the content of Tb is 0.5-2 wt. %;

or, when RH comprises Dy, the content of Dy is 0.5 wt. % or less;

or, when RH comprises Ho, the content of Ho is 0.8-2%.

14. The preparation method for the neodymium-iron-boron magnet material according to claim 8, wherein, the raw material composition of neodymium-iron-boron magnet material further comprises Cu; the content of Cu is 0.1-1.2%;

or, the raw material composition of neodymium-iron-boron magnet material further comprises Ga; the content of Ga is 0.45 wt. % or less;

or, the raw material composition of neodymium-iron-boron magnet material further comprises X; X comprises Zr, Nb, Hf or Ti;

or, the raw material composition of neodymium-iron-boron magnet material further comprises Co; the content of Co is 0.5-3%;

or, the raw material composition of neodymium-iron-boron magnet material further comprises O; the content of O is 0.13% or less;

or, the raw material composition of neodymium-iron-boron magnet material further comprises at least one selected from the group consisting of Zn, Ag, In, Sn, V, Cr, Mo, Ta and W.

15. The preparation method for the neodymium-iron-boron magnet material according to claim 10, wherein, the content of Al is 0.5-3%; the content of Cu is 0.35-1.2%; R' further comprises RH, RH refers to heavy rare earth elements, and the content of RH is 1-2.5%.

16. The preparation method for the neodymium-iron-boron magnet material according to claim 11, wherein, the content of Al is 0.5-3%; the content of Cu is 0.35-1.2%; R' further comprises RH, RH refers to heavy rare earth elements, and the content of RH is 1-2.5%.

17. The preparation method for the neodymium-iron-boron magnet material according to claim 8, wherein, after sintering and before the aging treatment, a grain boundary diffusion treatment is further carried out.

* * * * *